3,560,556
CYCLIC 2-STAGE METHOD FOR PRODUCING VINYL ACETATE FROM ETHYLENE
William E. Hendrix, Jr., and Robert B. Miinch, Lewiston, N.Y., assignors to E. I. du Pont de Nemours and Company, Wilmington, Del., a corporation of Delaware
No Drawing. Filed June 23, 1967, Ser. No. 648,224
Int. Cl. C07c 67/04
U.S. Cl. 260—497                                    6 Claims

ABSTRACT OF THE DISCLOSURE

Vinyl acetate is produced by a cyclic method in which an acetic acid catalyst solution (working solution) containing palladous, acetate, cupric and halide (chloride or bromide) ions is cycled continuously between two separate reaction stages. Ethylene is reacted with the solution in the first stage to produce vinyl acetate and partially reduced catalyst solution from which the vinyl acetate is separated, and the partially reduced solution is reacted with molecular oxygen in the second stage to reoxidize the solution before it is recycled to the first stage. In such a method, cuprous halide, which is precipitated in the solution in the first stage, forms objectionable adherent solid deposits upon equipment surfaces in the first stage. In accordance with the invention, such solid deposits are periodically removed from the first stage equipment surfaces by periodically discontinuing the feed of ethylene to the first stage while continuing the cycling through the first stage equipment of the reoxidized catalyst solution from the second stage.

BACKGROUND OF THE INVENTION

It is known [Moiseev et al., Doklady Akad. Nauk SSSR 133, 377 (1960)] that vinyl acetate can be produced by reacting ethylene with anhydrous acetic acid containing palladium chloride and sodium acetate. Preferably, the acetic acid reaction medium will also contain a cupric salt oxidizing agent, which functions to keep the palladium in its active +2 valence state, and a halide which serves to promote the reaction (British Patent 928,739). As the reaction proceeds, the cupric salt becomes reduced to a cuprous salt and in order to permit continuous operations it has been proposed to react the cuprous salt with molecular oxygen whereby it is reconverted to the cupric form. The reaction with oxygen can be effected simultaneously with the reaction involving ethylene in a single reaction zone, or it can be effected in a separate reaction zone in the absence of ethylene (Belgium Patent 608,610).

When ethylene and oxygen are reacted simultaneously with the working solution in the same reaction zone, the operation is generally referred to as a single-stage operation, whereas when such reactions are carried out in separate reaction zones, the operation is referred to as a two-stage operation. The two-stage type operation is distinctly advantageous in that it can be carried out without having to employ mixtures of ethylene and oxygen, thereby avoiding the explosion hazards attending the use and handling of such mixtures. It also permits the use of air as the source of oxygen for reoxidizing the reduced working solution, thus avoiding the necessity of employing oxygen or oxygen-enriched air, which would be more expensive.

The two-stage type operation, while advantageous for the above reasons, nevertheless presents some operating difficulties, one of the more important of which is the fact that solids comprising cuprous halide, which are produced in the first stage reaction, tend to form solid adherent deposits upon working equipment surfaces which are contacted by the reduced working solution. Such deposits are quite difficult to remove and since their deposition proceeds more or less continuously, the deposits continuously build up on the equipment surfaces. If the deposits are not removed at least periodically, their accumulation on the surfaces may eventually result in the plugging of various equipment parts such as valves, piping and the like, through which the solution must pass. Excessive deposition of such solids upon the surfaces of the first-stage reactor or fractionating column employed to separate the vinyl acetate product from the working solution also creates obvious heat transfer problems. Furthermore, solids deposited upon equipment surfaces serve no useful purpose in the cyclic process and represent an undesirable loss in the synthesis capacity of the working solution per cycle. The present invention provides a practical way of overcoming or minimizing such solids deposition problem and, more particularly, it provides a very practical way of removing such deposits from equipment surfaces.

SUMMARY OF THE INVENTION

Vinyl acetate is prepared from ethylene by a method employing a catalyst working solution which, in its oxidized state, is an acetic acid solution comprising palladous ions, acetate ions, cupric ions, halide ions (chloride or bromide), and from 0 to 20% by weight of water, in which method:

(A) the working solution is contacted and reacted in a first-reaction stage with ethylene to produce vinyl acetate and partially reduced working solution containing precipitated cuprous halide;
(B) the vinyl acetate produced is stripped as product from the partially reduced working solution;
(C) the partially reduced working solution is continuously contacted and reacted in a second separate reaction stage with molecular oxygen, whereby the reduced working solution is reoxidized; and
(D) the reoxidized working solution is continuously recycled to step (A), which method is characterized by the feature of periodically discontinuing the contacting of the working solution with ethylene in step (A) while the flow of the reoxidized working solution through the cycle is continued so as to effect contact, in the absence of ethylene, of the reoxidized working solution from step (C) with those equipment surfaces previously contacted with the reduced working solution, thereby to effect the dissolution of previously deposited solids comprising cuprous halide from those equipment surfaces.

One important advantage resulting from periodically discontinuing the feed of ethylene to step (A) while continuing the cycling of reoxidized working solution through the cycle is that the solids comprising cuprous chloride previously deposited upon equipment surfaces during their contact with reduced solution, are redissolved in the working solution and the continuing buildup of solids on equipment surfaces is thereby prevented. Another resultant advantage is that the working solution can be employed continuously over long periods of time without any significant reduction in its catalytic activity.

DETAILED DESCRIPTION OF THE INVENTION

In processes of this general type which are operated so as to effect the reaction involving ethylene in a stage separate from that in which the reaction involving oxygen is carried out, cuprous halides such as cuprous chloride and cuprous bromide, depending upon the particular halide ions present, are precipitated in the working solution in the stage where the solution is reacted with ethylene. These halides tend to deposit upon equipment surfaces which are contacted with the reduced working solution, examples of such surfaces being those of the first stage reaction vessel and the surfaces of the stripper still or similar equipment employed for separating the product vinyl acetate from the reduced working solution before the latter is cycled to the second stage reactor. As further amounts of cuprous halide are precipitated, deposits of such halides form and grow upon such equipment surfaces to produce coatings thereon which are tenaciously held. The solid deposits, in addition to the cuprous halide, will also generally include some palladium values and some of the other components of the working solution. All copper, palladium and other values present in the deposits on equipment surfaces constitute values removed from the working solution which no longer serve any useful purpose in the cycle, unless and until they are removed from the surfaces and again made part of the working solution.

The discovery on which the present invention is based, i.e., that the reoxidized working solution will dissolve and remove the above solid deposits from equipment surfaces in the absence of ethylene, was entirely unexpected since the contacting of the solid deposits with the oxidized working solution does not require the presence of molecular oxygen.

The working solution employed in the present two-stage operation will, in its oxidized state, comprise an acetic acid solution containing palladous ions, acetate ions, cupric ions, halide or bromide ions, and not more than 20%, e.g., 0 to 20%, preferably 3 to 13%, water based upon the weight of the working solution.

Suitable sources for the palladous ions (Pd++) are palladous chloride, palladous bromide, palladous acetate, and the alkali metal chlor- and bromopalladites such as potassium chloropalladite ($K_2PdCl_4$), sodium chloropalladite ($Na_2PdCl_4$) and lithium chloropalladite ($Li_2PdCl_4$), and the corresponding bromopalladites. Other palladium compounds which are soluble in acetic acid to provide palladous ions can also be used. Palladous chloride or palladous bromide and the corresponding alkali metal halopalladites are generally preferred, and the chloro compounds are distinctly preferred over the corresponding bromo compounds. Such compounds should be employed in amounts to provide pallodous ions at a concentration effective to catalyze the reaction of ethylene with the working solution to produce vinyl acetate. Palladous ion concentrations from 0.001 to 1 molar or higher are generally effective although the preferred concentrations generally range from around 0.003 to 0.1 molar. The palladous ion can be provided by charging to the working solution one or more of the above palladous salts, or metallic palladium or its oxide or carbonate may be charged and dissolved in the working solution.

The working solution should contain the acetate ion at a concentration substantially above that supplied by the ionization of the acetic acid itself. Suitable sources of the acetate ion are the alkali metal acetates, the alkaline earth metal acetates and copper, magnesium, stannic and cobalt acetates. Other metal acetates which are sufficiently soluble and ionizable in the working solution to provide a substantial concentration of acetate ions therein may also be used. The source of the acetate ion is not particularly significant so long as the concentration thereof, disregarding acetate ion supplied by the ionization of acetic acid, is sufficiently great to permit the reaction producing vinyl acetate to proceed at a practical rate. Generally, the acetate ion concentration, assuming complete solution and ionization of the metal acetate, should be at least 0.01 molar, e.g., 0.01 to 4 molar. Preferably, it will be at least 0.1 molar, e.g., 0.5 to 3 molar. Concentrations of one or more metal acetates exceeding their solubilities in the working solution can be used, in which case, the working solution will be a slury. Thus, the working solution in its oxidized state may include relatively large amounts of undissolved cupric acetate. As the reaction with ethylene proceeds, cupric acetate in solution is reduced to the cuprous salt and more of the cupric acetate dissolves. In the presence of the halide ion, the cuprous copper will precipitate as cuprous halide and, therefore, the working solution would be a slurry whose solid phase would include either cupric acetate or cuprous halide, or both, depending upon the state of oxidation.

The source of the cupric ions can be any copper compound (cupric or cuprous) which, in its cupric form, will not supply cations which will precipitate or otherwise inactivate the palladous ions and which will be sufficiently soluble and ionizable in the working solution to provide in the first reaction stage cupric ions at a concentration effective to prevent conversion of the palladous ion catalyst to precipitated metallic palladium. Preferred copper compounds are cupric acetate, cupric chloride, cupric bromide and cupric oxide. Cupric ion concentrations, assuming complete solution and ionization of the copper compound, generally should be at least as high as the concentration of palladous ions and, desirably, at least twice as high. With this in mind, cupric ion concentrations of from 0.2 to 2.5 molar, will generally be used and concentrations of 1 to 2.0 molar are preferred. As indicated previously, a substantial portion of the copper compound, e.g., cupric acetate, may be in its undissolved or slurry form.

The source of halide ions may be any metal chloride or bromide which is sufficiently soluble and ionizable to provide in the working solution in the first reaction stage halide ions at a concentration effective to promote the reaction to produce vinyl acetate. A wide variety of metal chlorides and bromides are known to be suitable as promoters, the more common and generally preferred being the chlorides and bromides of the alkali and alkaline earth metals, copper, magnesium, cobalt and the like, and mixtures of such chlorides and/or bromides. The chlorides are distinctly preferred over the bromides. The concentration of dissolved chloride or bromide ion, i.e., $CL^-$ or $Br^-$, but not halide present as precipitated halide such as precipitated cuprous chloride, in the first stage reactor should generally be at least 0.01 molar but not greater than about 0.9 molar, since higher concentrations tend to promote excessive production of by-product glycol acetates. The preferred concentrations generally will be from about 0.05 to 0.5 molar.

As indicated, the above halide ion concentrations are the actual chloride or bromide ion concentrations in the first stage reactor. Since reduction of the copper from the cupric to the cuprous state with precipitation of cuprous halide proceeds in that reactor, there must be present in the first stage sufficient soluble halide to provide the necessary halide concentration despite the removal of halide ion by precipitation as insoluble cuprous halide. This situation is readily brought abuot by carrying out the first stage reaction under conditions such that the working solution in the first stage reactor is maintained at an essentially constant composition and will include halide ions (dissolved halide) at a concentration in the range indicated above. This can be achieved by effecting the reaction with ethylene in a vessel provided with an efficient back-mixing of constant environment mixer so that the working solution continuously withdrawn from the vessel will be essentially identical in composition to the working solution in the reaction vessel. The composition of the working solution continuously fed to the vessel, i.e., the reoxidized working solution from the second stage of the cycle, will be entirely different and will be higher in halide ion concentration since it will include halide ion resulting from the dissolution of cuprous halide in the second stage.

In operation, the flow rate of the working solution through the first stage reactor should be sufficiently rapid to prevent reduction of all of the copper to the cuprous form, otherwise undesirable precipitation of metallic palladium will result. On the other hand, adjustment of the flow rate so that at least 70%, e.g., 70 to 95% of the copper is converted to the cuprous form, is advantageous to minimize byproduct formation. Operation at a copper conversion level, i.e., the percentage of the copper that is in the cuprous form, of 80 to 90% is preferred.

Depending primarily upon the water content of the working solution, more or less acetaldehyde will be produced along with the vinyl acetate in the first stage reaction. The co-production of substantial amounts of acetaldehyde may be advantageous in that it may be recovered for sale or use. Thus, it may be converted by known methods to acetic acid and the acetic acid so obtained be employed to supply all or part of the acetic acid requirements of the cyclic process in the second stage of which acetic acid is consumed in the conversion of cuprous halide to cuprous acetate according to the following equation when the metal acetate is sodium acetate:

$$2CuCl + 2CH_3CO_2Na + 2CH_3CO_2H + \tfrac{1}{2}O_2 \rightarrow 2Cu(CH_3CO_2)_2 + 2NaCl + H_2O$$

Generally, the water content of the working solution will not exceed 20% and contents of from about 3 to 13% will usually be preferred.

The reaction of ethylene with the working solution to produce vinyl acetate will generally be carried out at an ethylene pressure of at least 25 p.s.i.g., e.g., 25 to 2000 p.s.i.g., and at a temperature from room temperature to about 160° C. Higher pressures and temperatures can be used but generally result in no added advantage. The preferred ethylene pressures are 100 to 500 p.s.i.g. The preferred temperatures are 50 to 150° C. and those most preferred are 80 to 130° C.

The vinyl acetate product of the first stage reaction, generally together with some co-produced acetaldehyde, may be stripped continuously from the working solution as it is formed by passing a stream of excess ethylene through the working solution, which excess ethylene can be recycled after the vinyl acetate and acetaldehyde are separated therefrom, e.g., by condensation. Preferably, the partially reduced working solution, with the product vinyl acetate (and any acetaldeyhde) therein is passed to a stripper still from which the vinyl actate (and acetaldehyde) is recovered as overhead product and the partially reduced working solution is removed as still residue which is passed to the second stage reactor for reoxidation.

Reoxidation of the partially reduced working solution in the second stage is effected by contacting the working solution with molecular oxygen at an oxygen partial pressure of at least 0.01 atmosphere, generally 0.01 to 5 atmospheres or higher, and preferably at 0.1 to 2 atmospheres. The reoxidation is preferably effected using air as the source of the molecular oxygen. Oxygen and oxygen-enriched air can be also used but are more costly. The reoxidation will generally be effected at a temperature from 50 to 200° C. or higher, the preferred temperatures being 100 to 150° C.

As indicated by the reaction equation shown above, the reoxidation reaction consumes acetic acid and produces water. Accordingly, in any continuous cyclic operation, acetic acid must be fed to the system to make up for the acetic acid consumed, and water must be removed from the system to prevent its buildup to objectionable levels. The addition of make-up acetic acid and the removal of water can be effected at any desirable point in the cycle. It will generally be most convenient to add make-up acetic acid to the working solution at some point after the vinyl acetate has been stripped therefrom and before the reoxidized working solution from the second stage reactor is recycled to the first stage reactor. Removal of the desired amount of water can be effected at similar places in the cycle, however, sufficient water will generally be removed along the vinyl acetate overhead product from the stripper still so that removal at other points in the cycle, e.g., following the second stage reactor, will generally not be necessary.

The method of the invention is illustrated by the following examples. In the examples and throughout the specification, all compositions expressed as percentages are by weight.

EXAMPLE 1

A working solution of the following composition:

|  | Weight, percent | Molar concentration |
| --- | --- | --- |
| Cupric acetate | 20 | 1.32 |
| Sodium chloride | 6.45 | 1.32 |
| Palladous chloride | 0.05 | 0.003 |
| Water | 6 | 4 |
| Sodium metavanadate | 0.2 | 0.02 |
| Sodium acetate | 1.81 | 0.26 |
| Acetic acid | Balance | 13.1 | was cycled continuously to a back-mixing pressure reactor (first stage) where it was contacted at 120° C. with ethylene at 185 p.s.i.g. The rate of passage of the working solution through the reactor was such that the effluent solution was about 80% reduced, i.e., about 80% of the copper was present as cuprous copper. The partially reduced solution was passed to a continuous stripper still where vinyl acetate and acetaldehyde, together with some water, were taken off as overhead product and the partially reduced working solution was obtained as the still residue. The latter was passed to a continuous reoxidizer (second stage reactor) where it was contacted and reacted at about 122° C. with air at a partial oxygen pressure of 1.3 atmospheres. After adjustment of the resulting reoxidized working solution to approximately its original composition by the addition of make-up acetic acid, the solution was degassed to remove unreacted oxygen and then recycled to the first stage reactor for further reaction with ethylene. All equipment contacted with the working solution in the cycle was constructed of titanium. The working solution was cycled through the reactors of the two stages continuously.

Based upon the copper converted from the cupric to the cuprous state, the yield of vinyl acetate was 47.5% and the combined yield of vinyl acetate and acetaldehyde was 95%. However, as the cyclic operation was continued, a deposit of solids comprising cuprous chloride and containing palladium values began forming on the surfaces of the first stage reactor and on the stripper still surfaces. After continuous operation for about 21 hours, the deposit had increased to a thickness of about ¼ inch and represented a substantial withdrawal of active constituents from the working solution. At that point, the feed of ethylene to the first stage reactor was stopped while the feed of air to the second stage reactor and the cycling of degassed reoxidized working solution from the second stage reactor through the system was continued as previously for about 3 hours. By then, the solid deposits on the equipment surfaces had been substantially completely redissolved, whereupon the feeding of ethylene was resumed. After another period of feeding ethylene for about 21 hours, solids had again built up to an objectionable extent upon the equipment surfaces. At that point, the feeding of ethylene was again discontinued for about 3 hours while the cycling of reoxidized working solution was continued. The operation was continued in this general manner through 20 ethylene feed periods (totaling 493 hours) and 20 intermittent periods (totaling 71 hours) when no ethylene was fed. During the 564 hours of operation, air was fed continuously to the second stage reactor and the reoxidized working solution from that reactor was continuously recycled through the system. No decline in the catalytic activity of the working solution occurred.

During the periods when the feeding of ethylene was stopped, the working solution flowing to the second stage reactor was monitored to determine its copper and palladium contents, thereby to determine the rates at which those constituents of the working solution were replenished by dissolution of the solid deposits previously formed on the equipment surfaces. The replenishment or recovery of copper values (calculated as metallic copper) averaged 0.3 lb./hr./sq. ft. of surface area on which the solids were deposited. The recovery of palladium values (calculated as metallic palladium) averaged $6.3 \times 10^{-3}$ lb./hr./100 lbs. of total working solution.

EXAMPLE 2

The general procedure of Example 1 was repeated using the same cyclic equipment but with a working solution initially composed of:

|  | Weight, percent | Molar concentration |
| --- | --- | --- |
| Ammonium metavanadate | 0.06 | 0.006 |
| Cupric acetate | 20 | 1.32 |
| Lithium acetate | 1.12 | 0.13 |
| Palladous chloride | 0.04 | 0.003 |
| Water | 9 | 6 |
| Lithium chloride | 4.68 | 1.33 |
| Acetic acid | Balance | 13 |

The temperature and pressure conditions were essentially the same as indicated in Example 1 except that the temperature in the second stage reactor (reoxidizer) was 130° C. The system was operated continuously with the feeds to both stages until, after about 48 hours, the total copper content (calculated as metallic copper) of the working solution had decreased from an initial value of 7% to only 2.8% due to deposition of solids comprising cuprous chloride upon the equipment surfaces. At that point, the ethylene feed was shut off for 15.5 hours while reoxidized working solution from the reoxidizer was recycled through the system. The working solution was then analyzed and found to contain 7% copper, showing that all copper deposits had been redissolved. The 15.5 hours when the ethylene feed was stopped was much longer than was actually necessary to effect complete solution of the deposits.

EXAMPLE 3

The general procedure of Example 1 was repeated using the same cyclic equipment but with a working solution composed initially of:

|  | Weight, percent | Molar concentration |
| --- | --- | --- |
| Cupric acetate | 16 | 1.06 |
| Sodium acetate | 1.45 | 0.21 |
| Palladous chloride | 0.04 | 0.003 |
| Water | 10 | 6.7 |
| Sodium chloride | 5.16 | 1.06 |
| Sodium metavanadate | 0.19 | 0.02 |
| Acetic acid | Balance | 13.4 |

The temperature and pressure conditions were essentially the same as indicated in Example 1 except that the temperature in the second stage was about 116°C. The system was operated continuously with the feeds to both stages for about 30 hours, at which time sufficient solids had become deposited on the equipment surfaces to reduce the total copper content of the working solution from an initial value of 5.6% to 3.4%. Then the ethylene feed was stopped for 3 hours while reoxidized working solution was continuously cycled through the system. Analyses at that time showed that the working solution had regained its original total copper content.

Ethylene was again fed until the copper content of the working solution again become marked lowered, whereupon the ethylene feed was again shut down until the solution had again regained approximately its original copper content. Operation in this manner was continued through 7 intermittent periods of ethylene shutdown. The total time for the periods of ethylene feeding was 189 hours, and the total time for the intermittent ethylene shutdown periods was 38 hours. At the end of the operation, the equipment surfaces were essentially free of solid deposits and the working solution had essentially its original copper content.

EXAMPLE 4

The general procedure of Example 1 was repeated using the same cyclic equipment but with a working solution initially composed of:

|  | Weight, percent | Molar concentration |
| --- | --- | --- |
| Cupric acetate | 12.6 | 0.83 |
| Sodium acetate | 1.71 | 0.25 |
| Palladous chloride | 0.04 | 0.003 |
| Water | 10 | 6.7 |
| Sodium chloride | 3.64 | 0.75 |
| Sodium metavanadate | 0.19 | 0.02 |
| Acetic acid | Balance | 14.4 |

The temperatures and pressure conditions were essentially as stated in Example 1 except that the temperature in the second stage was 130° C. The system was operated continuously with the feeds to both stages for about 24 hours, at which time solids deposited upon the equipment surfaces had reduced the total copper content and the palladium content, respectively, of the working solution from initial values of 4.4% and $22.7 \times 10^{-3}\%$ to only 2.6% and $7.8 \times 10^{-3}\%$. Then the ethylene feed was discontinued for 3 hours while the cycling of reoxidized solution throughout the system was continued. Analyses at that time showed that the working solution had regained its original total copper and palladium contents. The rate of copper recovery averaged 0.29 lb./hr./sq. ft. of equipment surface on which solids had deposited. The rate of palladium recovery averaged $5 \times 10^{-3}$ lb./hr./100 lbs. of working solution.

Operation was continued as indicated in Example 3 through 8 intermittent periods of ethylene shutdown, the total time for the periods of ethylene feeding being 213 hours and the total time for the shutdown periods being 45 hours. At the end of the operation, the equipment surfaces were essentially free of solid deposits and the working solution had essentially its original copper and palladium contents.

EXAMPLE 5

The general procedure of Example 1 was repeated using the same cyclic equipment but with a working solution initially composed of:

|  | Weight, percent | Molar concentration |
| --- | --- | --- |
| Cupric acetate | 20 | 1.32 |
| Sodium acetate | 1.81 | 0.26 |
| Palladous chloride | 0.05 | 0.004 |
| Water | 10 | 6.7 |
| Sodium chloride | 6.45 | 1.32 |
| Sodium vanadate | 0.19 | 0.02 |
| Acetic acid | Balance | 12.3 |

The temperature and pressure conditions were essentially as stated in Example 1. The system was operated continuously with the feeds to both stages for about 24 hours, at which point solids deposited upon the equipment surfaces had reduced the copper and palladium contents, respectively, of the working solution from 7% and $32 \times 10^{-3}\%$ to only 4.7% and $14 \times 10^{-3}\%$. The ethylene feed was then discontinued for 3 hours while the cycling of reoxidized solution through the system was continued. Analyses at that time showed that the working solution had regained its original copper and palladium contents. The rate of copper recovery averaged 0.37 lb./hr./sq. ft. of equipment surface on which solids had deposited. The rate of palladium recovery averaged $6 \times 10^{-3}$ lb./hr./100 lbs. of working solution.

Operation was continued as indicated in Example 3 through 13 intermittent periods of ethylene shutdown, the total time for the periods of ethylene feeding being 348.5 hours and the total time for the shutdown periods being 63.5 hours. At the end of the operation, the equipment surfaces were essentially free of solid deposits and the working solution had essentially its original copper and palladium contents.

EXAMPLE 6

The general procedure of Example 1 was repeated using the same cyclic equipment but with a working solution initially composed of:

|  | Weight, percent | Molar concentration |
|---|---|---|
| Cupric acetate | 14.88 | 0.98 |
| Sodium acetate | 1.34 | 0.20 |
| Palladous chloride | 0.06 | 0.004 |
| Water | 7 | 4.7 |
| Sodium chloride | 4.8 | 0.98 |
| Sodium vanadate | 0.12 | 0.01 |
| Acetic acid | Balance | 14.3 |

The temperature and pressure conditions were essentially as stated in Example 1 except that the temperature in the second stage was 130°C. The system was operated continuously with the feeds to both reactors for about 20 hours, at which point solids deposited on the equipment surfaces had reduced the copper and palladium contents, respectively, of the working solution from 5.2% and $38 \times 10^{-3}\%$ to 2.8% and $12 \times 10^{-3}\%$. The ethylene feed was then shut off for 3 hours while the cycling of reoxidized solution through the system was continued. Analyses at that time showed that the working solution had regained its original copper and palladium contents. The rate of copper recovery averaged 0.38 lb./hr./sq. ft. of equipment surface on which solids had been deposited. The rate of paladium recovery averaged $8.6 \times 10^{-3}$ lb./hr./100 lbs. of working solution.

Operation was continued as indicated in Example 3 through 9 intermittent periods of ethylene shutdown, the total time for the periods of ethylene feeding being 128.5 hours and the total time for the shutdown periods being 33.5 hours. At the end of the operation, the equipment surfaces were essentially free of solid deposits and the working solution had essentially its original copper and palladium contents.

EXAMPLE 7

The general procedure of Example 1 was repeated using a working solution essentially composed of:

|  | Weight, percent | Molar concentration |
|---|---|---|
| Cupric acetate | 18.3 | 1.21 |
| Palladous chloride | 0.11 | 0.008 |
| Sodium chloride | 4.66 | 0.96 |
| Water | 7 | 4.7 |
| Acetic acid | Balance | 14 |

The cyclic equipment was the same as that of Example 1 except that the first stage reactor was provided with a titanium probe inserted into the body of working solution so as to submerge a known surface area of the probe in the working solution. The probe was designed so as to facilitate its removal at any desired time for examination and determination of the amount of solids which had been deposited thereon. The temperature and pressure conditions were essentially those indicated in Example 1.

The system was operated continuously for 7 hours with the feeds to both reactors, at which point examination of the probe showed that solids had deposited thereon at an average rate equivalent to 0.0082 pound of copper per hour per square foot. Then the feed of ethylene to the first stage reactor was discontinued for one hour, while the feed of air to the second stage reactor and the cyling of the reoxidized working solution through the system was continued uninterruptedly. Examination of the probe at the end of the one hour period showed that the previously deposited solids on the probe surfaces had become essentially completely redissolved. After the feeding of ethylene to the first stage reactor was again resumed and continued for 21 hours, examination of the probe showed that solids were again being deposited at a substantial rate. After then discontinuing only the ethylene feed to the system for 6 hours, examination of the probe showed that substantially all previously deposited solids had again become essentially completely redissolved.

The frequency of the periods when the feed of ethylene to the first reactor is distontinued while the recycling of reoxidized solution is continued can be varied considerably and will depend mainly upon the rate at which solids are deposited upon the equipment surfaces, which in turn will depend somewhat upon the composition of the working solution in use and the specific conditions under which the system is being operated. The duration of each period of ethylene shutdown will be influenced by the above factors and also by the surface area of the first stage reactor, the type and degree of agitation and the physical properties of the solid deposits. The duration of such periods may be sufficient to effect dissolution of all or only part of the solids previously deposited. In any case, the frequency and duration of the ethylene shutdown periods should be sufficient to prevent excessive solids buildup on the equipment surfaces. Generally, periods of ethylene shutdown occurring about once a day and for durations of 1 to 6 hours or longer will suffice. As a general rule, the greater the frequency of such shutdowns, the shorter need to the duration of each. However, whatever the frequency, any such shutdown for any significant time will be beneficial in removing solids that have deposited on the equipment surfaces.

We claim:
1. In a continuous cyclic two-stage method for preparing vinyl acetate from ethylene employing a catalyst working solution which, in its oxidized state, is an acetic acid solution comprising palladous ions, acetate ions, cupric ions, halide ions from the group consisting of chloride and bromide ions, and from 0 to 20% by weight of water, in which method:
    (A) said solution is contacted and reacted in a first reaction stage with ethylene to produce vinyl acetate and partially reduced working solution containing precipitated cuprous halide;
    (B) the vinyl acetate is stripped as product from the partially reduced working solution;
    (C) the stripped partially reducel working solution is continuously contacted and reacted in a second separate reaction stage with molecular oxygen, whereby the partially reduced working solution is reoxidized; and
    (D) the reoxidized working solution is continuously recycled to step (A), said method being characterized by the deposition of solids comprising cuprous halide upon equipment surfaces contacted by said partially reduced working solution, the improvement comprising periodically discontinuing the contacting of said working solution with ethylene in step (A) while continuing the flow of the reoxidized working solution through the cycle so as to effect contact, in the absence of ethylene, of said reoxidized working solution from step (C) with those equipment surfaces having deposits of said solids thereon, whereby said solids become dissolved in the working solution.

2. The method of claim 1 wherein the working solution in step (A) is an acetic acid solution comprising palladous ions at a concentration of 0.001 to 1 molar, acetate ions at a concentration of 0.01 to 4 molar, copper ions at a concentration of 0.2 to 2.5 molar, chloride ions at a concentration of 0.01 to 0.9 molar, and from 0 to 20% water; and wherein the reaction in step (A) is effected at a temperature from room temperature to 160° C. at an ethylene pressure of at least 25 p.s.i.g., and the reaction in step (C) is effected at a temperature of 50 to 200° C. at an oxygen partial pressure of at least 0.01 atmosphere.

3. The method of claim 1 wherein the working solution in step (A) is an acetic acid solution comprising palladous ions at a concentration of 0.003 to 0.1 molar, acetate ions at a concentration of 0.5 to 3 molar, copper ions at a concentration of 1 to 2.0 molar, chloride ions at a concentration of 0.05 to 0.5 molar and from 3 to 13% water; and wherein the reaction in step (A) is effected at 50 to 150° C. at an ethylene pressure of 100 to 500 p.s.i.g., and the reaction in step (C) is effected at 100 to 150° C. at an oxygen partial pressure of 0.1 to 2 atmospheres.

4. The method of claim 1 wherein the periods while the contact of the working solution with ethylene in step (A) is discontinued occur about once a day and the duration of each such period is about 1 to 6 hours.

5. The method of claim 2 wherein the periods while the contact of the working solution with ethylene in step (A) is discontinued occur about once a day and the duration of each such period is about 1 to 6 hours.

6. The method of claim 3 wherein the periods while the contact of the working solution with ethylene in step (A) is discontinued occur about once a day and the duration of each such period is about 1 to 6 hours.

References Cited

UNITED STATES PATENTS

| | | | |
|---|---|---|---|
| 3,221,045 | 11/1965 | McKeon et al. | 260—497 |
| 3,277,159 | 10/1966 | Schaeffer | 260—497 |
| 3,306,930 | 2/1967 | Copelin et al. | 260—497 |

LORRAINE A. WEINBERGER, Primary Examiner

V. GARNER, Assistant Examiner

U.S. Cl. X.R.

252—416; 260—530, 604